July 5, 1938. A. J. McMASTER 2,123,142
INDICATING AND CALCULATING SYSTEM
Filed Sept. 19, 1932 2 Sheets-Sheet 1
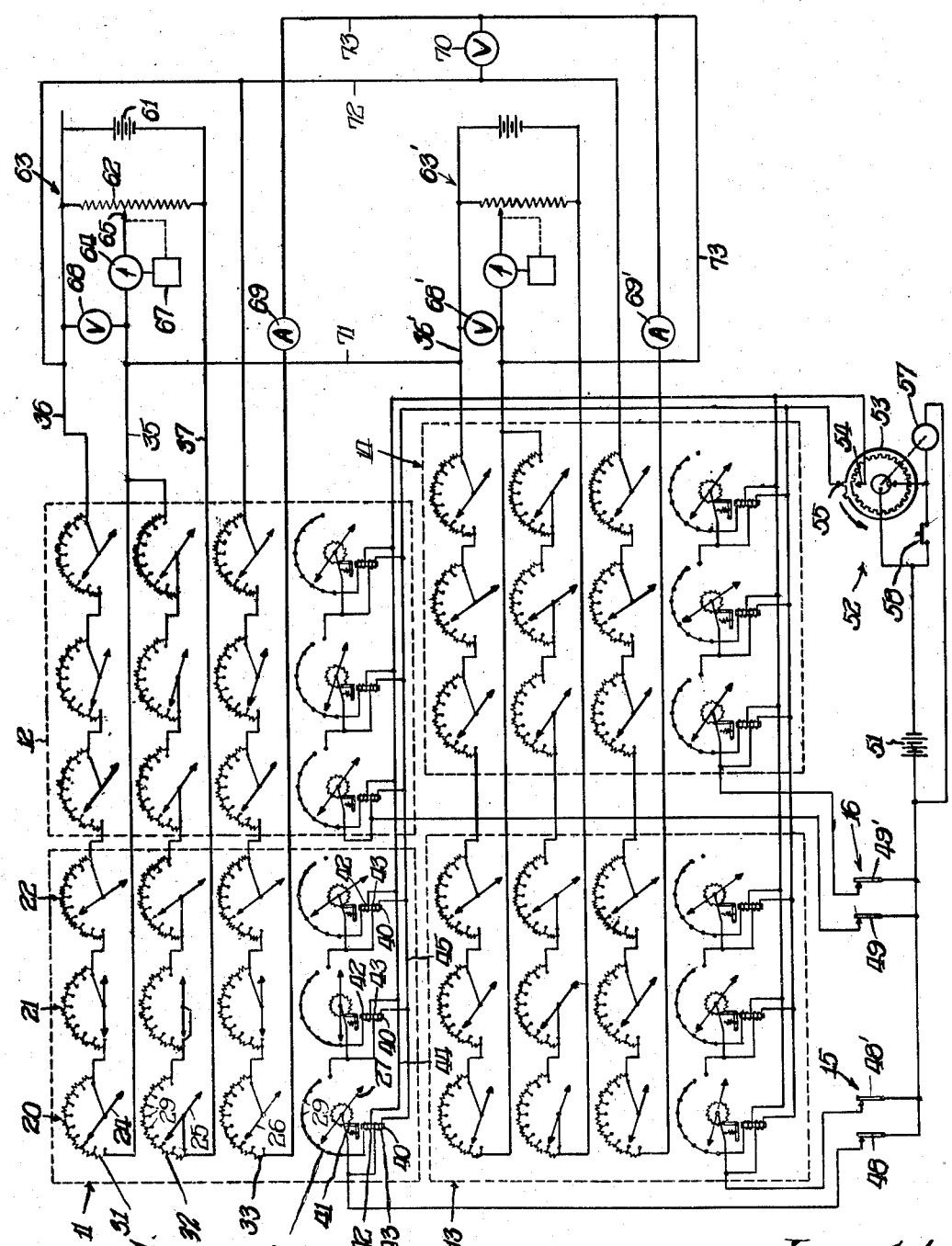
Inventor:
Archie J. McMaster,
By Mueller + McLaughlin
attys.

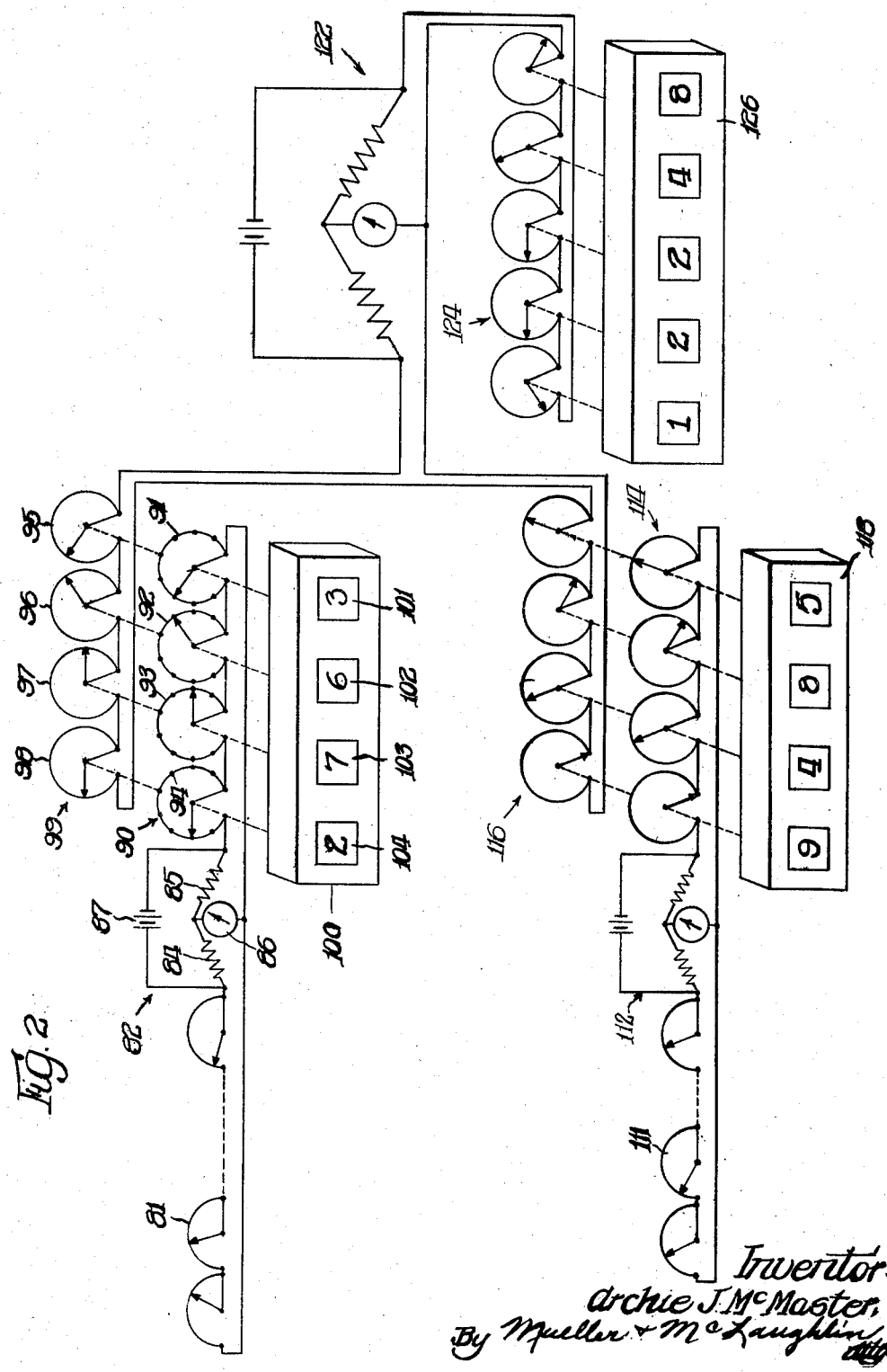

Patented July 5, 1938

2,123,142

UNITED STATES PATENT OFFICE 2,123,142

INDICATING AND CALCULATING SYSTEM

Archie J. McMaster, Highland Park, Ill., assignor to G-M Laboratories, Inc., Chicago, Ill.

Application September 19, 1932, Serial No. 633,719

5 Claims. (Cl. 235—61)

My present invention relates generally to the art of calculating and more particularly to the rapid performance of calculations involving large numbers of quantities.

Various calculating devices have been heretofore known to the art but prior devices with which I am acquainted have been seriously limited in the number of quantities that could be involved simultaneously in a calculation. Thus for example in totalizing and tally apparatus it often has been necessary that the quantities or scores to be entered in the tallies be scored or entered (or transmitted to the apparatus) singly so as to permit the calculations to be carried out in steps. It has been attempted to permit such prior devices to handle large numbers of simultaneously received or scored quantities by employing a delay program whereby the several quantities, though they may be scored substantially simultaneously, nevertheless enter into the computations in some sort of sequence.

In certain applications a calculator subject to such limitations of capacity and speed of operation is decidedly inadequate.

In the operation of various traffic control systems, and the like it is often desirable to perform calculations involving large numbers of quantities with great rapidity so as to provide a continuous indication as by means of a display, of a then present state of events, or to provide a prompt and reliable automatic control of subordinate devices. Such calculations commonly consist in totalizing counts or tallies taken at a number of points of observation.

It is accordingly a primary object of my present invention to provide a method of, and means for, rapidly performing calculations involving large numbers of quantities.

A further object of my invention is the provision of improved means for adding together a number of quantities to indicate a total thereof.

A further object is the provision of means for adding a number of simultaneously scored quantities and for instantaneously indicating the total thereof.

A further object is the provision of means responsive to a number of independent tally devices for instantaneously totalizing quantities scored therewith.

Other objects and advantages will appear hereinafter.

In carrying out my present invention, I provide a device comprising a number of component parts each of which exhibits a certain variable and measurable property or phenomenon, and I so associate such parts together that their separate properties or phenomena enter as components into a measurable whole. Each of the separate parts of the device are then varied according to a particular scored quantity or group of scored quantities so that a mere measurement of the whole provides an instantaneous indication of the computed result as determined by such component quantities as may have been scored at any particular time.

Specifically, in one embodiment of my invention which is adapted to totalize a number of separate tallies each of which is composed of one or more scores, I provide an electrical circuit having component parts, each of whose resistance may be varied according to a component tally as rapidly as the individual scores of that tally are entered, the total resistance of all such parts being measured to determine the computed result. Under certain conditions, I also employ other measurable electrical characteristics of the circuit in accomplishing the objects of my invention.

In order to acquaint those skilled in the art with the teachings and practice of my present invention, I shall now describe a specific embodiment of the same, reference being had to the accompanying drawings forming a part of this specification, and wherein:

Figure 1 illustrates, more or less schematically, one form of the preferred embodiment of my invention; and Figure 2 illustrates, similarly, a modification thereof.

In Fig. 1 of the drawings I have illustrated more or less schematically a totalizing device having capacity to compute and indicate the totals of two different classes of observations, each class of observation being made at two different points. Thus, where two classes of objects or sizes of packages are each discharged into a conveyor at two different points, the total count of the objects in each class as well as the total of all objects would be computed. The actual counting of the objects may be accomplished manually or by any known means. The device of the present invention is directed to computing totals and relations between such totals as rapidly as they are scored. The device shown in Fig. 1 comprises essentially a plurality of electric resistance circuits, one of which is assigned to each class of objects or packages that are to be counted, each circuit being divided into a plurality of sections one of which is assigned to each station at which observations of that particular class of objects is to be observed. Associated with each circuit is a means for indicating the total of all objects of each class, and according to one manner of carrying out my invention means may also be provided for indicating the total of all objects of all classes as well as the relation the total of each class bears to the total of all classes.

In counting the objects of a certain class at two or more points of observation, it is not necessary that they be scored or registered in the same units. Thus, assume that the two classes of objects to be counted are "good" and "rejected" and that the counts are taken at two different conveyors handling one pound and four pound packages respectively. One resistance circuit will be assigned to the "goods" and the other circuit to the "rejects". The first section of each circuit will be assigned to the conveyor carrying the one-pound packages and the second section to the conveyor carrying the four-pound packages. The resistance values employed in the second circuit will then be made four times those of the first circuit, so that the indicated total will be in pounds regardless of the conveyor or station at which the counts were made. The "goods" and "rejects" are totaled separately by the separate circuits assigned to them and these totals are then entered together into a grand total and the relations that the "goods" and "rejects" bear to the grand total are also computed and indicated. These computations of totals and grand totals and the relations between them are all accomplished and the results indicated by the mere registration of the observation, score, or count at the point of observation so that the results of all computations are displayed substantially instantaneously upon the tally being made at the point of observation.

Referring now to the drawings in more detail, I provide a plurality of unit counting groups or circuit controlling devices 11, 12, 13 and 14, the groups 11 and 13 being arranged to be actuated by a control station 15 and the counting groups 12 and 14 being arranged to be actuated by a similar control station or control station 16. The counting devices 11 and 12 are associated together to control a common system of tally circuits as are also the devices 13 and 14. The counting device 11 comprises a plurality of indexing switches 20, 21, and 22, each of which is provided with switch arms 24, 25, 26, and 27 having cooperating contact banks 31, 32, 33 and 34.

Each contact bank consists of ten contact members 29 disposed in a semi-circle to be successively engaged by the indexing arm, the arm being double ended so that it may be continually indexed in one direction to step from one contact member to the next in a definite sequence.

The indexing switches 20, 21, and 22 are each provided with a spring operated indexing pawl 41 having an actuating magnet 40 for tensioning the spring. Each magnet 40 has two windings 42 and 43. Power for the operation of the actuating magnets is supplied from a battery or suitable power source 51 under control of the control stations 15 or 16 and a resetting device 52. The resetting device consists of a commutator 53 having a normally open contact 54 and a normally closed contact 55. The commutator is arranged to be driven through a predetermined cycle of operation by a motor 57, a normally open push button switch 58 being provided for manually setting the motor and commutator into operation.

The actuating circuit for the counter group 11 extends from the battery 51, through a normally closed score entering switch 48 of the control station 15, thence to the arm 27 of the indexing switch 20 and to one side of the coil 43 of the same switch. When the arm 27 of the switch 20 engages the tenth or last contact of its bank 34, the actuating circuit is extended to the arm 27 and coil 43 of the indexing switch 21, and in like manner the circuit is extended to the switch 22 when both the switches 20 and 21 occupy their 10th indexed position. The circuit then extends through each of the coils 43 to a control bus 45, thence through the contact 55 and commutator 53 to return to the battery 51.

Another actuating circuit may be traced from the battery 51, through the switch 48 and the arm 27 of the indexing switch 20. When the switch 20 occupies any of its first nine positions, the circuit extends to the coil 42 of that switch, and when the switch 20 occupies its tenth position, the circuit is extended to the indexing switch 21 which similarly extends the circuit either to its own coil 42 or to the indexing switch 22. The circuit is completed through the several coils 42, the bus 44, and the normally open commutator contact 54 back to the battery.

The indexing switches of the counter group 13 have similar actuating circuits extending through a normally closed score entering switch 48', also located at the control station 15, while the counter groups 12 and 14 have their actuating circuits extending through switches 49 and 49' of the control station 16.

The several contacts of the banks 31, 32 and 33 have resistors or impedance devices of appropriately predetermined value connected between them, which resistances are arranged to be switched by their respective switch arms 24, 25 and 26. The banks 31 and 32 of the two counting devices 11 and 12 constitute a potentiometer circuit which may be traced as follows:

Beginning at a conductor 36 and extending through the several resistor and contact banks 31 of the groups 11 and 12 to a variable voltage tap 35 and thence through the several banks 32 to a conductor 37.

The nine resistors connected between the ten contacts of the bank 31 of the indexing switch 20 and the nine resistors of the bank 32 thereof, each have a resistance of an appropriate unit value. The resistors in the corresponding banks of the indexing switches 21 and 22 are of values of ten and one hundred times such unit value, respectively. The resistors associated with the indexing switches of the group 12 are similarly decaded though their resistance values may be based on another unit value, such unit values, as between these two groups, being proportional to the magnitudes of the scores to be entered by the switches 48 and 49.

The resistors of each bank 31 are normally shorted out of the circuit when the contact arm 24 occupies its normal position, and are arranged to be switched into the circuit as the arm is indexed in a clockwise direction, while the resistors of the bank 32 are normally connected in the circuit and arranged to be shorted out as the arm 25 is indexed. A battery 61 and a resistor 62 of a balancing potentiometer 63 are connected in parallel with the series circuit comprising the several banks 31 and 32 by means of conductors 36 and 37, the tap 35 being connected through a galvanometer 64 to an adjustable contact 65 of the balancing potentiometer. Suitable automatic means 67 are controlled by the galvanometer 64 to adjust the contact 65 to a balance position on the resistor 62. The balancing device 67 may comprise any of the known mechanically or electrically controlled devices for balancing bridge circuits, potentiometers and the like. A voltmeter 68 is connected between the conductors 35 and 36.

The several banks 33 of the counting devices 11 and 12 are similarly provided with decaded resistances of suitable value and are connected in series with an ammeter 69.

The counting groups 13 and 14 are similar to the groups 11 and 12 and are associated together in the same manner and similarly connected to a balancing potentiometer 63'. A conductor 71 connects the tap 35 to the conductor 36' to connect the banks 31 of the counters 11 and 12 in series with the banks 31 of the counters 13 and 14, a voltmeter 70 being connected across the whole series arrangement by means of conductors 72 and 73. The resistor circuit consisting of the banks 33 of the counters 11 and 12 and the ammeter 69, together with the corresponding circuit of the counters 13 and 14 is also connected between the conductors 72 and 73.

In operation, the control bus 45 is normally maintained connected to the battery through the contact 55 of the resetting commutator so as to permit operation of the coils 43, while the bus 44 is kept isolated to prevent the coils 42 from being energized. The coils 43 of the switches are energized prior to indexing the same to tension an operating spring, and the indexing is accomplished by de-energizing the magnet to permit the spring to move the switch arm. As the objects passing along the conveyor or the like are counted or scored at the control stations the switches 48 and 48' are actuated according to the class to which each count or score refers. Thus the switch 48 will be actuated each time an object of one class is counted or scored, and the switch 48' will be actuated each time an object of the other class is counted or scored. Each time the score entering switch 48 is opened, the coil 43 of the indexing switch 20 is denergized to permit pawl 41 under the action of a spring to index its several switch arms one position in a clockwise direction. Accordingly, when the switch 48 has been opened and re-closed nine times, the switch arm 27 will occupy the 10th position so as to energize the coil 43 of the indexing switch 21. When the switch 48 opens the 10th time, the arm of the indexing switch 20 moves forward one step to assume its normal position and the arm of the switch 21 indexes one step into its second position. The switch 21 is thus indexed one step each 10th time the switch 48 is opened and operates upon reaching its 10th position to actuate the indexing switch 22 in a like manner.

As the several contact arms of the indexing switches are stepped from one position to the next, resistance is cut into circuit in the banks 31 while at the same time equal amounts of resistance are shorted out in the banks 32, so as to alter the resistance between the connections 35 and 36 while maintaining the total resistance constant between the terminals 36 and 37. Thus, in starting from the normal position, the arm 24 of the switch 20 switches resistance into the circuit in increments of one unit during each of nine steps and then shorts it all out again on the tenth. However, simultaneously with the tenth step of the switch 20, the switch 21 is indexed one step to insert a resistance of ten units. The switch 22 is similarly controlled by the operation of the switch 21 so that the resistance between the connections 35 and 36 increases in uniform steps in response to the operation of the indicating switch 48. In a like manner, the indexing switches of the counter group 12 also increase the resistance between the terminals 35 and 36 according to the operation of the indicating switch 49. It is obviously immaterial to the operation of the present device whether or not the quantities indicated by the switches 48 and 49 are the same, inasmuch as the unit value of the resistor units of each counter group may be chosen according to the value of the quantity indicated by its particular indicating switch.

As the resistance changes between the conductors 35 and 36, the voltage imposed across them by the potentiometer circuit changes proportionally. This voltage as well as the resistance then serves as an indication of the total of all counts or scores of the particular class to which the circuit is assigned. The voltmeter 68, as well as the self adjusting potentiometer 63, may be calibrated in any suitable units to indicate the total of all the scores of that class.

Similarly, the counting devices 13 and 14 are actuated by the switches 48' and 49' in response to the counts or scores of quantities of another class, the total being indicated by the voltmeter 68' and/or the adjusted position of the balancing potentiometer 63'. The voltmeter 70 being connected across the resistor banks 31 of all the counting groups provides an indication of the total of all counts or scores of both classes. The system can be extended obviously to include any desired number of units each of which could be assigned, for example, to a different classification of the objects to be counted.

The resistors connected across the banks 33 of the counters 11 and 12 are switched into circuit in the same manner as are the resistors of the bank 31 so that at all times the total resistance in the banks 33 of the counters 11 and 12 serve as an indication of the total count of objects of that class. This resistance being connected across the same voltage as the voltmeter 70, which voltage indicates the total of all counts, draws a current which is proportional to the ratio existing between the total of all counts of all classes and the counts of a particular class. This is in accordance with the familiar "Ohm's law" as applied to electric circuits. Therefore, this current serves as an indication of the proportional part or "percentage" that the particular class is of the whole at any particular time. This ratio or "percentage" is indicated directly by a suitable calibration of the scale of the ammeter 69. Similarly, the ammeter 69' gives an indication of the "percentage" which the other class bears to the whole.

The resetting of the counters to their normal position is accomplished automatically by operation of the resetting device 52. Upon closing the push-button switch 58, the motor 57 is energized to operate the commutator 53 which then by-passes the switch 58 so as to maintain the motor in operation until the resetting has been completely accomplished. The commutator moves in a counter-clockwise direction and first opens the contact 55 to de-energize the control bus 45 and thereafter repeatedly energizes and de-energizes the control bus 44. It will be noted that the several actuating switches 48, 49, etc. are normally closed so that the power is supplied therethrough to the indexing switches during resetting. Referring to the indexing switches 20, 21, and 22, energy is supplied through the switch arm of the control bank 34 of the switch 20, and through the first nine contacts to the operating coil 42 so that the commutator 53 in alternately energizing and de-energizing the control bus 44, causes the switch arm to be indexed around to its tenth position whereupon the circuit to the coil 42 of the switch 20 is interrupted. The circuit then extends to the arm 27 of the switch 21 to energize its coil 42 so that the operation of the commutator causes the switch 21 to be indexed to its tenth position and then in a like manner to reset switch 22. The switch 22 upon reaching its tenth position opens the circuit. The commutator 53 is provided with a sufficient number of contact points to index all switches to their final or tenth position, which, in the device as shown in the drawings, requires 30 contact points. After pulsing the bus 44, in the above manner, thirty times, the commutator then leaves the bus 44 de-energized and closes the contact 55 to the bus 45 so as to energize all the coils 43. The bus 45 is then de-energized so as to permit all the switches to index into their first or normal position and is then again re-energized so as to place the device in condition for operation, the commutator automatically stopping to leave the bus 45 so energized.

In Figure 2, I have shown a modification of the device of Figure 1. The reference numeral 81 indicates a number of series connected resistance banks and switches therefor. These banks are associated with indexing switches arranged to switch the resistors 81 into the circuit in response to the operation of suitable indicating switches similar to the indexing switches of Figure 1. Thus, for example, the resistors 81 represented diagrammatically in Fig. 2 may correspond to the banks 31 of resistors shown in Fig. 1. These resistors 81 may accordingly be switched into circuit by suitable associated switches in response to quantity tallies in the same manner as the resistor banks 31 are controlled. This group of resistor banks 81 constitutes one arm of a Wheatstone bridge or resistance measuring means 82. The bridge circuit also includes a pair of ratio arms 84 and 85, a galvanometer 86, a current source 87 and a balancing arm 90 comprising a number of series connected adjustable resistors 91, 92, 93 and 94. These resistors are each adjustable in 10 equal steps, the resistor 92 being adjustable in steps ten times the value of those of resistor 91 and similarly the resistors 93 and 94 are adjustable in steps one hundred and one thousand times the value of those of resistor 91, respectively.

Associated with the resistors 91, 92, 93 and 94 is another group of resistors designated generally by the reference character 99 and comprising adjustable resistors 95, 96, 97 and 98 which are similarly decaded to correspond to the resistors 91, 92, 93 and 94 respectively. Associated also with the resistors 91, 92, 93 and 94 are number displays 101, 102, 103 and 104, respectively of a visual indicator 100. The adjustable resistors 91 and 95 and the display 101 are mechanically connected as for example with a common shaft, so that they may be operated together to give similar indications. Thus the resistors 91 and 95 will always assume values corresponding to the same number of unit values of resistance and the display 101 will show that number. In the drawings, the resistors 91 and 95 are each shown as being set at a resistance of three units and the display 101 is shown indicating the number 3. Similarly the resistors 92 and 96 and the display 102 are connected to be operated together etc.

Another group of resistance banks, 111, which like the resistor banks 81, are switched by indexing switches in the manner described in connection with Figure 1, is connected into a Wheatstone bridge circuit 112. The bridge 112 like the bridge 82 has a balancing arm composed of a number of decaded adjustable resistors 114 which have associated with them other decaded resistors 116 and a visual indicator or display device 118.

The resistor groups 99 and 116 are connected together in series and constitute one arm of still another Wheatstone bridge circuit 122. A balancing arm of the bridge 122 comprises a number of adjustable resistors 124 each of which is connected to a display of a visual indicator 126.

In operation the several resistors 81 are switched according to the count of objects of a particular class or tally of scores of a particular class so as to vary the resistance presented thereby to the bridge circuit 82. The bridge is balanced according to the usual manner by adjusting the resistance of the balancing arm 90 until the galvanometer shows a zero reading. This may be accomplished manually or by means of any known automatic balancing device. In the balanced condition, the resistance of the arm 90 as determined by the adjustments of the resistors 91, 92, 93 and 94, bears a predetermined relation to the total resistance of the several banks 81 and therefore to the total count of articles or tallies of scores of that particular class. In adjusting the resistors of the balancing arm 90, the resistors of the group 99 and also the displays of the indicator 100 are correspondingly adjusted. The indicator 100 therefore displays a series of numbers indicating the setting of the resistors 91, 92, 93 and 94 and which may be read together as a single number indicating the adjusted resistance value of the whole balancing arm 90 and indicating also the total value of all tallies of the particular class to which the resistance banks 81 are assigned. Preferably the unit value of resistance of the balancing arm 90 is so chosen with respect to the ratio arms 84 and 85 and also with respect to the resistors 81, that the display device 100 reads directly in some convenient unit value such as number of articles counted—or the total weight of all articles in pounds or the like.

Similarly the resistance banks 111 are switched according to counts or tallies of another class and the balancing arm 114 is adjusted to a corresponding value by balancing the bridge 112 to a null reading of its galvanometer. The visual indicator 118 thereupon indicates the total value of all tallies of the class to which the resistor banks 111 are assigned.

The balancing of the bridge circuits 82 and 112 also adjusts the associated resistor groups 99 and 116 to the values of resistance corresponding to the total value of the counts or tallies of the respective classes. These two groups being connected in series, present to the bridge circuit 122 a resistance proportional to the total value of all tallies of both classes. For this purpose it is necessary that the groups 99 and 116 must indicate according to the same ratio of resistance to the quantities scored. That is, they must employ equal values of resistance to indicate equal tallies, so that these resitances may be added to give the proper total indication.

The bridge 122 is balanced by adjusting the several resistors of the balancing arm 124 and the visual indicating device 126 is adjusted simultaneously with balancing arm 124 so as to display a number indicating the total value of all counts or tallies of both classes.

It will be apparent from the foregoing description that the device of my present invention may be enlarged to meet any requirements by a mere addition of duplicate unit parts. It will also be apparent that operation of any one or more units can in no way interfere with the proper operation of any other unit and that the separate quantities will be properly and promptly entered into the calculation regardless of the rapidity or order of their being scored and regardless of the number of them that may be scored simultaneously.

While I have shown and described certain embodiments of my present invention, it will be apparent to those skilled in the art that the principles thereof are broader than the specific disclosure. I therefore do not wish to be limited to any particular form of construction or use but wish to avail myself of all such modifications and variations as fall within the scope of the appended claims.

Inasmuch as the present invention may be practiced by the use of impedance devices other than resistors, I have used the term "impedance" in the claims in a broad sense, as including all that is commonly understood by that term when used in connection with an alternating current circuit and including also resistance as associated with a direct current circuit.

I claim:

1. In an indicating system, a plurality of pairs of variable impedance devices, a first device of each pair being connected into a first series group and the second device of each pair being connected into a second series group, said groups being connected in series in a potentiometer circuit, means for varying each pair of impedance devices to simultaneously equally and oppositely vary each device thereof so as to vary the impedance of each group while maintaining the impedance of the potentiometer circuit constant, means for supplying a current to the potentiometer circuit and means for measuring the voltage across one of said series groups.

2. In a calculating and indicating system, a potentiometer circuit comprising two series resistor groups which in turn comprise a plurality of pairs of resistor banks, one bank of each pair being in each group, means comprising indexing switches for switching said pairs of banks to increase the resistance of the banks in one group and to simultaneously and equally decrease the resistance of the banks in the other group, and control means adapted to be operated for causing operation of said indexing switches.

3. The combination of claim 2 wherein there is included: a resistance circuit, means for varying the resistance of said resistance circuit, and means for measuring the current flow in said resistance circuit, and wherein said resistance circuit is connected across one of said series groups.

4. In an indicating and calculating system, a potentiometer circuit having a pair of output terminals, means including a plurality of first score entering devices for varying the potential difference between said terminals in accordance with a first program of scores entered in a first group of tallies, said first score entering devices being operable for entering the scores of said first program, a second potentiometer circuit having a pair of output terminals, means including a plurality of second score entering devices for varying the potential difference between the terminals of said second circuit according to a second program of scores entered in a second group of tallies, said second score entering devices being operable for entering the scores of said second program, and means connected in series relation with the output terminals of both said circuits and responsive to said potential differences for indicating a total of all said scores entered in said tallies.

5. In an indicating and calculating system, a plurality of potentiometer circuits each having a pair of output terminals, means including score entering devices for varying the potential difference between the output terminals of each circuit in accordance with a separate program of scores entered in tallies, said score entering devices being operable for entering the scores in said tallies, a separate potential difference meter connected across the output terminals of each potentiometer circuit, a series circuit embracing the output terminals of said potentiometer circuits, and another potential difference meter in said series circuit.

ARCHIE J. McMASTER.